(12) United States Patent
Lorenz et al.

(10) Patent No.: US 8,736,118 B2
(45) Date of Patent: May 27, 2014

(54) SINGLE-CHANNEL SAFETY OUTPUT

(75) Inventors: Dirk Lorenz, Wetter (DE); Norbert Machuletz, Wetter (DE); Rudolf Papenbreer, Wuppertal (DE); Thomas Helpenstein, Grevenbroich (DE)

(73) Assignee: Rockwell Automation Germany GmbH & Co. KG, Wuppertal (DE)

( * ) Notice: Subject to any disclaimer, the term of this patent is extended or adjusted under 35 U.S.C. 154(b) by 628 days.

(21) Appl. No.: 13/084,056

(22) Filed: Apr. 11, 2011

(65) Prior Publication Data

US 2011/0266890 A1 Nov. 3, 2011

(30) Foreign Application Priority Data

Apr. 30, 2010 (EP) .................................. 10161647

(51) Int. Cl.
*H01H 83/00* (2006.01)
*H02H 7/00* (2006.01)
*H02H 11/00* (2006.01)

(52) U.S. Cl.
CPC .............. *H01H 83/00* (2013.01); *H02H 7/00* (2013.01); *H02H 11/00* (2013.01)
USPC .......................................... 307/326; 307/328

(58) Field of Classification Search
CPC .......... H01H 83/00; H02H 7/00; H02H 11/00
USPC .................................................. 307/326, 328
See application file for complete search history.

(56) References Cited

U.S. PATENT DOCUMENTS 6,628,015 B2 * 9/2003 Pullmann et al. ............. 307/326
7,130,171 B2 * 10/2006 Pullmann et al. ............... 361/62

FOREIGN PATENT DOCUMENTS

| DE | 100 11 211 A1 | 9/2001 |
|---|---|---|
| DE | 100 11 211 B4 | 8/2004 |
| DE | 102005014122 A1 | 9/2006 |
| DE | 102006027135 B3 | 9/2007 |
| DE | 102008018257 A1 | 10/2009 |
| WO | 0181820 A1 | 11/2001 |
| WO | 03085313 A2 | 10/2003 |

OTHER PUBLICATIONS

Extended European Search Report, European Application No. 13183362.6, Mailing Date Nov. 20, 2013—(8) Pages.

* cited by examiner

*Primary Examiner* — Hal Kaplan
(74) *Attorney, Agent, or Firm* — Boyle Fredrickson, S.C.

(57) ABSTRACT

A safety switching device for fail-safely switching on and off an electrical load, and to a system comprising at least two safety switching devices which interact in a fail-safe manner via a single-channel. The safety switching device comprises a fail-safe control unit, a first and a second electronic switching element connected with a first and a second output terminal; and at least one input terminal for receiving a first switching signal that causes a switching of said switching elements. Said first and second switching elements each comprise an output which provides depending on the first switching signal an output signal having a first or second potential. A third output terminal connects said safety switching device to a second safety switching device, providing a clocked signal depending on the first switching signal and being monitored by said control unit for performing a cross fault detection.

20 Claims, 2 Drawing Sheets

SINGLE-CHANNEL SAFETY OUTPUT

CROSS REFERENCE TO RELATED APPLICATIONS

This application claims priority to European Patent Application No. EP10161647 filed on Apr. 30, 2010 titled "Single-Channel Safety Output" and the disclosure of which is incorporated herein.

BACKGROUND

The present invention relates to a safety switching device for fail-safely switching on and off an electrical load. The present invention in particular relates to a safety switching device comprising a fail-safe control unit, a first and second electronic switching element, a first and second output terminal and at least one input terminal for receiving a switching signal that causes switching off said switching elements.

The invention further relates to a safety switching device system comprising at least two safety switching devices which interact in a fail-safe manner.

Safety switching devices are, for instance used in industrial production environments in order to reliably and safely disconnect machines, such as a hydraulic press or a milling machine, if this is necessary for the safety of personnel or machinery. Safety switching devices typically have one or more input terminals to which input devices such as emergency stop buttons, two-hand operator buttons, guard door switches or light curtains can be connected. An evaluation and control unit evaluates the input signal from these input devices in a fail-safe manner and produces a switching signal on an output side being a function of same. The evaluation and control unit is also designed to operate in a fail-safe manner, for instance by providing redundancy. The switching signal controls actuators, in particular contactors for disconnecting the machine from a power supply.

The term "fail-safe" signifies that disconnecting the machine must be ensured under all circumstances, even if a functional fault occurs within the chain comprising the input device, the safety switching device and the actuator. Safety switching devices must therefore be designed such that they ensure that the machine being monitored is always in a safe state, even in the event of the failure of one component, in the case of broken cables or other malfunctions. Accordingly, the term "safety-switching device" in this context refers only to those devices and appliances which comply at least with category 3 of European standard EN 954-1, or comparable requirements.

In DE 100 11 211 B1, a safety switching device and a system of more than one safety switching device is shown, wherein the safety switching device system comprises two safety switching devices which are connected to each other via two lines. By providing two signals which are clocked in a way that they have different signals, a cross connection between those two lines can be detected by means of an additional feedback signal. With this configuration, a category 4 safety level can be achieved.

This known solution, however, suffers from the drawback that in order to be able to classify the system as safety category 4, an enhanced expenditure in terminals and additional lines has to be provided.

There is therefore a need to provide a safety switching device and a system of safety switching devices which allow for a cross-fault detection on the one hand and can be realized in a particularly simple and economic way on the other hand.

SUMMARY OF THE INVENTION

The present invention provides a safety switching device that overcomes one or more of the drawbacks above. One aspect of the present invention provides a single-channel connection between a first safety switching device and a second safety switching device which transmits defined clocked pulses and, by monitoring this signal by the first switching device ensures fail safety not via the redundancy of two parallel lines, but via a monitoring of the signal.

According to another aspect of the present invention, the safety switching device comprises a third output terminal for connecting the first safety switching device to a second safety switching device, the third output terminal providing a clocked signal depending on the first switching signal and being monitored by the control unit for performing the required cross fault detection. A short-circuiting between the two coupling lines cannot occur because only one line is provided and the fault connection to 24 V, 0 V, or other differently clocked lines can be detected.

According to another advantageous embodiment of the present invention, the signal which is output by the third output terminal is suitable for powering the second safety switching device. This can for instance be achieved by providing an energy storage unit within the second safety switching device, such as a capacitor, which transforms the clocked pulse train of the output signal from the first safety switching device into a constant DC power supply, for instance of 5 V.

According to another aspect of the present invention, the clocked signal comprises a train of defined pulses in the case that the safety switching device has a valid safety function. In a preferred aspect, this pulse train has the structure of a predetermined code that can be read by the first and/or the second safety switching device. In the case that the safety status indicates a fault, the safety switching device outputs at the third output terminal a constant 0 V signal.

According to another aspect of the invention, the first safety switching device monitors the output signal and in case of any cross faults, detects the absence of the correct predetermined code signal. Preferably, the second safety device can first monitor the input signal and also recognizes if the expected code signal is not received. The pulsed output signal from the third output terminal is fed into a power supply terminal of the second safety switching device. In the case that the 0 V signal is sent to the second safety switching device, no power supply can be generated from this signal. The second safety switching device either returns to or remains in a safe status.

By using a pulse code for the clocked signal which differs from all other clocked signals present in the safety switching device and the safety switching device system, according to the present invention a cross fault to other clocked signals can also be detected. In order to achieve redundancy and therefore comply with a high safety standard, the failsafe control unit of the safety switching device may comprise two redundant microprocessors which are operable to monitor the clocked single-channel output signal in a parallel way.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed as is intended to include all such aspects and their equivalents. Other advantages and

DETAILED DESCRIPTION OF THE PREFERRED EMBODIMENTS

Figure 1:
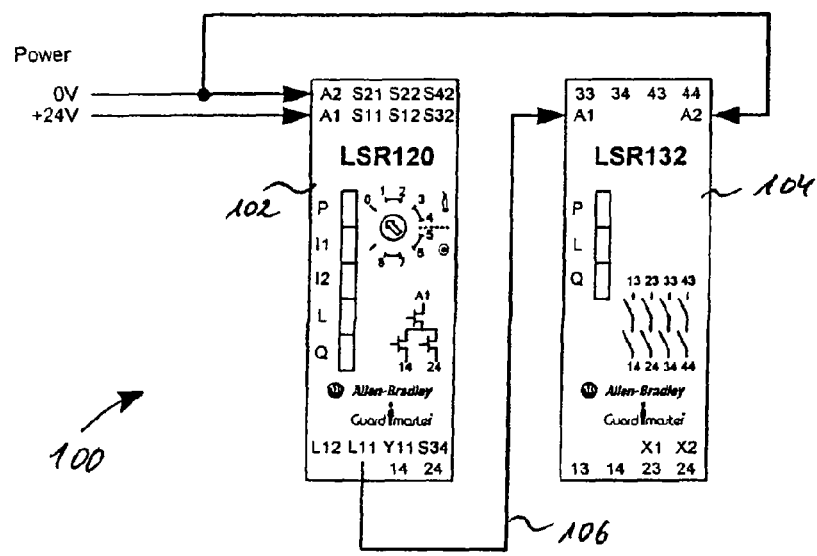
FIG. 1 shows a schematic diagram of a safety switching device system according to the present invention.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well known structures and devices are shown in block diagram form in order to facilitate a description thereof.

As used in this application, the terms "component", "system", "equipment", "interface", "network" and/or the like are intended to refer to a computer related entity, either hardware a combination of hardware and software, software or software in execution. For example, a component can be, but is not limited to being, a process running on a processor, or a processor, a hard disk drive, multiple storage drives (of optical and/or magnetic storage medium), an object, an executable, a thread of execution, a program and/or a computer, an industrial controller, a relay, a sensor and/or a variable frequency drive. By way of illustration, both an application running on a server and a server can be a component. One or more components can reside within a process and/or thread of execution, and a component can be localized on one computer and/or distributed between two or more computers.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a variable frequency drive and controller, to implement the disclosed subject matter. The term "article of manufacture" as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, FIG. 1 schematically shows a safety switching device system 100 according to a first embodiment in the most basic construction. The system comprises a first safety switching device 102 and a second safety switching device 104.

The first switching device 102 may for instance be an emergency stop device having safe semiconductor outputs at the terminals 14 and 24. In order to allow for an enhanced number of actuating outputs, for instance in the case that several machines or machine elements have to be switched off in the case of an emergency, there may be the requirement of adding to the first safety switching device 102 either an additional safety switching device of the same kind or a contact expansion unit representing a second safety switching device 104.

These contact expansion units 104 supply additional output current paths as this is generally known, but do not posses logic units of their own for processing the signals apart from a logic for monitoring the integrity of the signals.

Conventional systems, such as the one shown in DE 100 11 211 B4, use two separate connections in order to comply with the highest safety standard, category 4, as IL3. The disadvantage of such a dual channel solution can firstly be seen in the fact that an additional line and an additional terminal has to be provided, and that secondly cross faults between these two lines can occur.

According to the present invention, the safety switching device 102 comprises a fail-safe single-channel output L11. This single-channel output L11 can be connected via a connection line 106 to an input A1 of the contact expansion device 104.

The required safety is ensured by transmitting a pulsed output signal on the single-channel line 106 which can be monitored internally by the safety switching device 102. By monitoring the power strain of the clocked signal on line 106, short circuits to 24 V and 0 V potential and connections to lines which have a differently clocked signal can be detected. Consequently, an essential requirement for fulfilling the standard category 4 can be met.

The contact expansion device 104 which is connected to the fail-safe output L11, receives electric power from the safety output L11 and at the same time, the status of the safety function.

Although in FIG. 1 only two safety switching devices 102, 104 are shown, it is clear for a person skilled in the art that an arbitrary number of devices can be connected via the inventive single-channel output.

Figure 2:
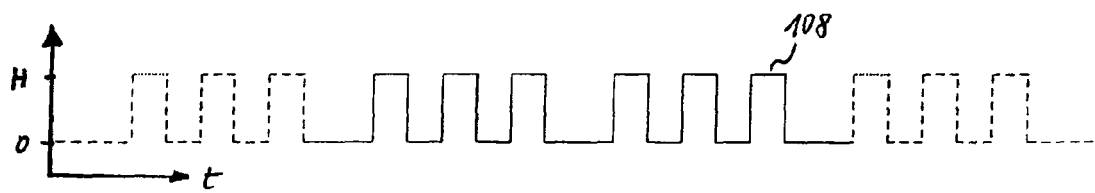
FIG. 2 shows an example of a pulse code to be transmitted on the fail-safe single-channel connection.

FIG. 2 shows an example of the signal 108 that is output by the inventive single-channel safety output terminal L11. The signal 108 may for instance be equal to a constant 0 V signal in the case that the safety function is "not true", that is, indicates the occurrence of a fault condition.

On the other hand, if the safety output is "true", the signal 108 has a well-defined pulse pattern as shown in FIG. 2. This pulse pattern which represents a code can be recognized by an internal monitoring unit (not shown in the figures) of the first safety switching device 102. As this is usually done by conventional devices, this monitoring is done in a two-channel manner by two independent microprocessors.

Figure 3:
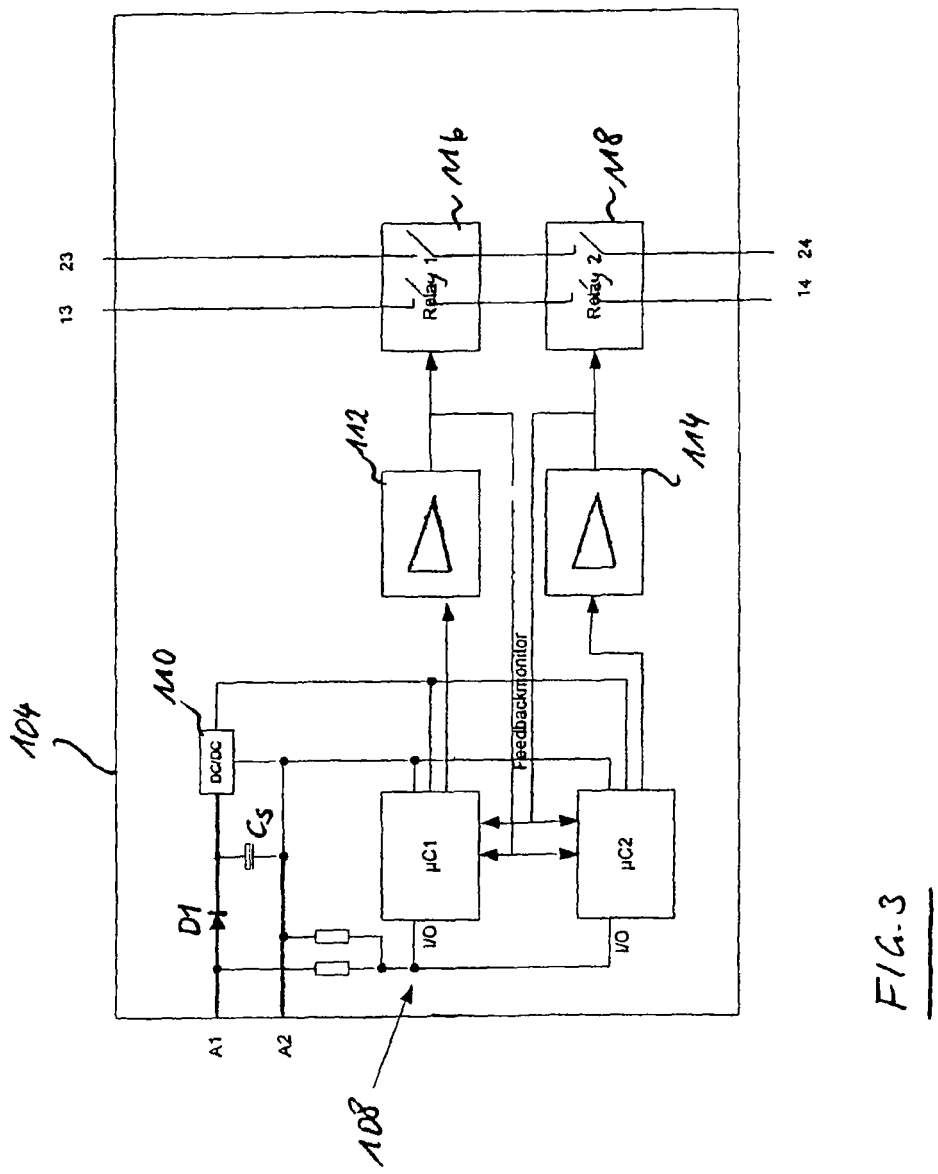
FIG. 3 shows a block diagram of a second safety switching device.

The contact expansion device 104, on the other hand, receives the signal 108 and processes same as will be shown with reference to FIG. 3. As can be derived from this circuit diagram, the second safety switching device which receives the signal at terminal A1 splits the received signal and firstly, uses it for feeding a power storage capacitor CS and secondly, inputs the signal into the microcontrollers μC1 and μC2.

A DC/DC converter 110 which is connected to the storage capacitor CS generates a supply power having a supply voltage of 5 V from the input 24 V pulse train signal.

The input A2 of the second safety switching device 102 receives the 0 V ground potential which is also input into the first switching device 102.

As soon as the safety function of the first safety switching device 102 is "true", the clocked output L11 produces a clocked signal 108. Consequently, connected second switching device 104 is provided with the supply voltage via the diode D1, the storing capacitor CS and the voltage controller 110, representing the necessary operating voltage. The capacitor CS may for instance be an electrolyte capacitor. Any other storing means may of course also be used here. When powered by the output of the DC-DC converter 110, the microcontrollers μC1 and μC2 start up. If these microprocessors now additionally detect a valid pulse code at their I/O terminals, the driver units 112, 114 are controlled to trigger the relays 116 and 118 for providing a switched-on status of the safety outputs 14 and 24.

Consequently, A1 must receive a voltage different from 0 V which additionally must have a valid pulse pattern in order to cause the safety switching device 104 to output a valid output signal. With the inventive safety device topology, it is possible to fulfill the requirements of category 4 of the safety standards, although only a single-channel connection is employed.

This high safety category is achieved on the side of the second safety switching device due to the predetermined dynamics of the signal and the two-channel evaluation of this signal by using both microprocessors. On the other hand, the high safety standard on the side of the sending first safety switching device 102 is achieved by means of a two channel feedback of the output signal generated at terminal L11 whereby short circuiting to 24 V, 0 V, or to other clocked signals can be detected.

Furthermore, by feeding back this output signal to both processors in a parallel way, a plausibility check can be performed in order to monitor the fault free function of the microprocessors.

However, in case of a fault condition, the first safety switching device 102 outputs a constant 0 V signal at terminal L11 because the safety function of this device is no longer "true". Then also the safety outputs of the subsequent safety switching device 104 are switched off because, firstly, no valid clocked signal pattern is supplied to input terminal A1 and, secondly, because the input terminal A1 no longer receives a supply voltage which could supply energy to the microprocessors and the relays. As can be seen in FIG. 3, the relays 116, 118 can also be powered by the output from the DC/DC converter 110.

Of course, the single-channel safety output according to the present invention can also be used for connecting to any other safety input of different safety switching devices. The system is particularly suitable for connecting a safety switching device with one or more a delayed expansion modules.

The invention claimed is:

1. Safety switching device for safely switching on and off an electrical load, said safety switching device comprising:
   a fail-safe control unit;
   a first and a second electronic switching element;
   a first and a second output terminal;
   at least one input terminal for receiving a first switching signal that causes a switching of said switching elements; and
   wherein said first and second switching elements each comprise an output which provides, depending on the first switching signal, an output signal having a first or second potential, and wherein the output of the first switching element is connected with the first output terminal and the output of the second switching element is connected with the second output terminal, and
   wherein said safety switching device further comprises a third output terminal for connecting said safety switching device to a second safety switching device, said third output terminal providing a clocked signal depending on the first switching signal and being monitored by said control unit for performing a cross fault detection.

2. Safety switching device according to claim 1, wherein said third output terminal is further adapted to provide power to said second safety switching device.

3. Safety switching device according to claim 1, wherein said clocked signal comprises a train of pulses indicative of a true safety status of the safety switching device.

4. Safety switching device according to claim 3, wherein said third output terminal outputs a constant 0 V signal, if the safety status of the safety switching device indicates a fault.

5. Safety switching device according to claim 1, wherein the clocked signal provided by the third output terminal is unique with respect to all other clocked signals present in the safety switching device.

6. Safety switching device according to claim 1, wherein said fail-safe control unit comprises two redundant micro processors and wherein said clocked signal at the third output terminal is monitored by both micro processors in a two channel configuration.

7. Safety switching device system comprising:
   at least a first and a second safety switching device for fail/safely switching on and off an electrical load;
   the first safety switching device comprising:
   a fail-safe control unit;
   a first and a second electronic switching element;
   a first and a second output terminal; and at least one input terminal for receiving a first switching signal that causes a switching of said switching elements;

wherein said first and second switching elements each comprise an output which provides, depending on the first switching signal, an output signal having a first or second potential, and wherein the output of the first switching element is connected with the first output terminal and the output of the second switching element is connected with the second output terminal; and wherein said first safety switching device further comprises a third output terminal for connecting said first safety switching device to said second safety switching device, said third output terminal providing a clocked signal depending on the first switching signal and being monitored by said control unit for performing a cross fault detection.

8. System according to claim 7, wherein said third output terminal is further adapted to provide power to said second safety switching device.

9. System according to claim 7, wherein said clocked signal comprises a train of pulses indicative of a true safety status of the safety switching device.

10. System according to claim 9, wherein said third output terminal outputs a constant 0 V signal if the safety status of the first safety switching device indicates a fault.

11. System according to claim 7, wherein clocked signal differs from all other clocked signals present in the safety switching device.

12. System according to claim 7, wherein said fail-safe control unit comprises two redundant micro processors and wherein said clocked signal at the third output terminal is monitored by both micro processors in a two-channel configuration.

13. System according to claim 7, wherein said second safety switching device is a contact expansion module.

14. System according to claim 7, wherein said second safety device comprises a second control unit having two redundant micro processors, wherein said clocked signal is input into both micro processors for being evaluated in parallel.

15. System according to claim 7, wherein said second safety device comprises an energy buffer unit which is connected to said clocked signal for generating a supply voltage for said second safety device.

16. A method for controlling switching on and off an electrical load, said method comprising:

communicating a first switching signal to a first safety switching device to cause switching of at least one of a first switching element and a second switching element to at least one input terminal;

communicating an output signal having one of a first potential or a second potential to each of the first and second switching elements of the first safety switching device;

generating an output signal having one of a first potential or a second potential depending on the first switching signal of each of the first and second switching elements;

connecting an output of the first switching element to a first output terminal and connecting an output of the second switching element to a second output terminal;

connecting a third output terminal of the first safety switching device to a second safety switching device; and communicating a clocked signal that depends on the first switching signal between the first safety switching device and the second safety switching device via the third output terminal.

17. The method of claim 16 further comprising monitoring the clocked signal with a control unit and performing a cross fault detection.

18. The method of claim 17 further comprising configuring the control unit to fail to a safe condition.

19. The method of claim 16 further comprising communicating a power signal to the second safety switching device via the third output terminal.

20. The method of claim 16 further comprising monitoring the clocked signal at the third output terminal with each of two redundant micro processors that are oriented in a two channel configuration.

* * * * *